Dec. 8, 1970        H. J. McDERMOTT        3,545,827

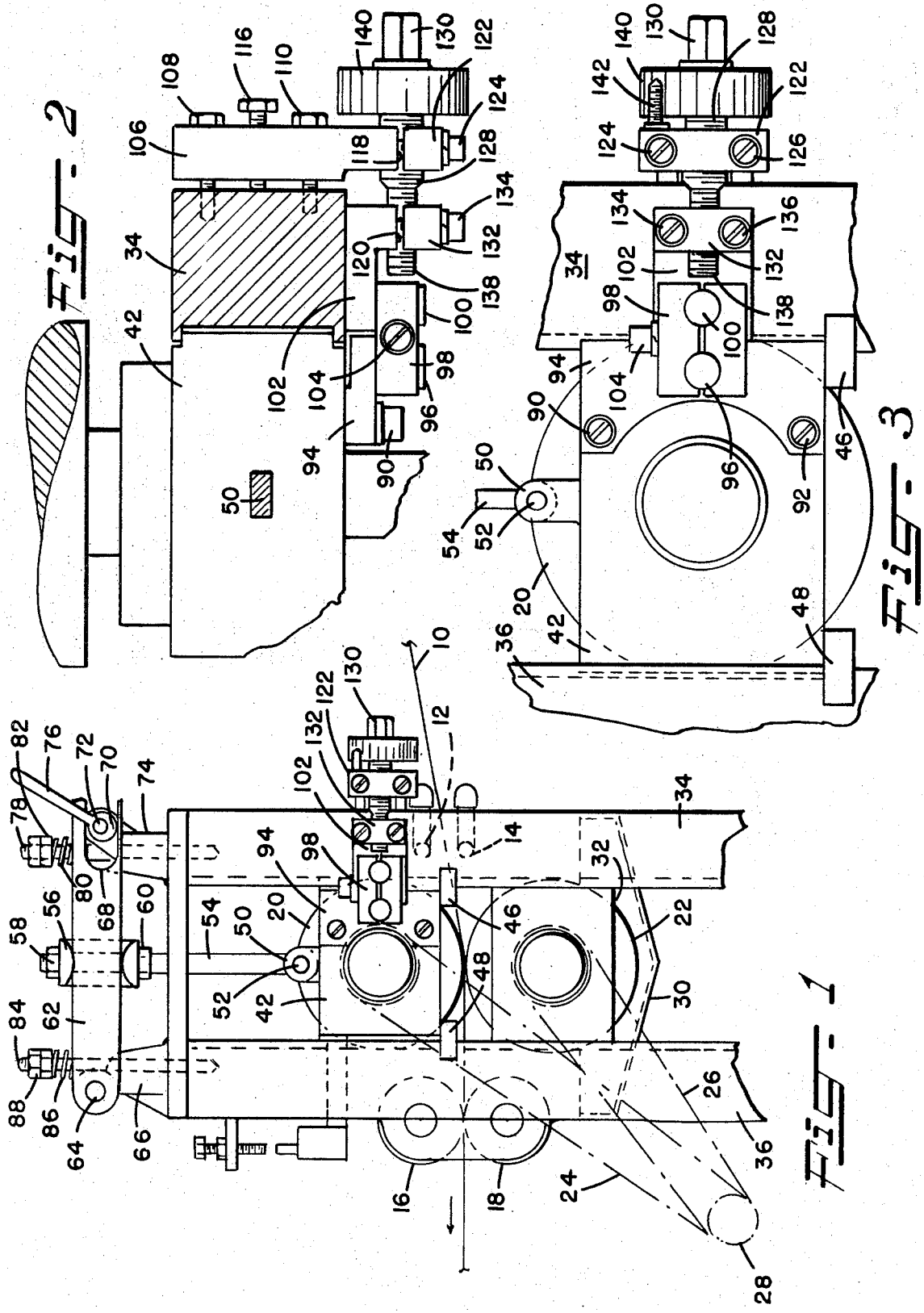

ROLLER POSITION ADJUSTMENT MECHANISM

Filed June 25, 1968        2 Sheets-Sheet 2

# United States Patent Office 3,545,827
Patented Dec. 8, 1970

3,545,827
ROLLER POSITION ADJUSTMENT MECHANISM
Henry J. McDermott, Collingdale, Pa., assignor to FMC Corporation, Philadelphia, Pa., a corporation of Delaware
Filed June 25, 1968, Ser. No. 739,791
Int. Cl. F16c 29/12
U.S. Cl. 308—58
4 Claims

ABSTRACT OF THE DISCLOSURE

Mechanism for rapidly and precisely positioning the axis of a first roller in a desired skewed relationship with respect to the axis of a second roller with which the first roller cooperates in carrying out some operation such as coating a web or film. The mechanism is so arranged that under certain circumstances the first roller may move bodily away from the second roller.

---

This invention relates to mechanism for precisely positioning a roller in a desired longitudinal orientation and more particularly to mechanism for adjustably positioning a first roller in a skewed relationship with respect to the axis of a second roller.

A known method of providing a uniform coating on a web or film is to flood the surface of the web with an excess of coating material in fluid form and then uniformly spread the coating and doctor off the excess by passing the web between a pair of closely spaced hard surfaced driven rollers. When the rollers are of uniform diameter from end to end and have their axes parallel, the hydraulic pressure in the mid-length section of the rollers can cause the rollers to deflect or bend and move farther apart in the middle whereby the coating is thicker along the center of the web than along the edges. The greater the speed of the web through or between the rollers, the greater the hydraulic pressure and the greater the bending and consequently the greater the unevenness of the coating. To a lesser extent, the hydraulic pressure also varies with the nature of the coating material. This deflection or bending can of course be largely overcome by strengthening the rollers as by having a low length to diameter ratio but this is impractical when coating a wide web where rollers ten feet or more in length may be necessary.

One method of overcoming this uneven coating is to construct one or both rollers so as to have a diameter profile bowing or tapering from a maximum in the middle toward a smaller diameter at the ends. In this manner, the hydraulic pressure will tend to bend the rollers so that the surfaces become substantially parallel throughout their length whereby to produce an even coating over the entire width of the web. However, this method is subject to the objection that for any particular taper of the diameter profile only a rather limited speed range will produce the proper hydraulic pressure to deflect the rollers to the degree necessary to provide parallel surfaces. Furthermore, tapered rollers are more difficult to manufacture than uniform diameter rollers.

Another method of compensating for the deflection or bending of the rollers in the middle is to mount them so that their axes are slightly askew whereby they are farther apart at the ends than in the middle. In this maner, deflection of the midportion of the rollers due to the hydraulic pressure will tend to equalize the spacing throughout the length of the rollers and thus produce an even coating. This method offers the advantage of being able to use either rollers of uniform diameter throughout or rollers with a tapering diameter profile but even so, any particular degee of skewness will compensate for the deflection caused by hydraulic pressure for only a limited speed range. It is therefore desirable to provide an arrangement or mechanism whereby the degree of skewness of the rollers may be precisely and with facility adjusted so as to adapt the equipment to different speeds of operation. The problem is somewhat complicated by the fact that after the skew adjustment is accomplished, the rollers must be capable of moving bodily apart in the event that the web breaks and begins to wind around and build up on one of the rollers and further complicated by the fact that in order to facilitate the introduction of the web therebetween it is desirable to be able to selectively move them farther apart.

It is therefore an object of the present invention to provide an improved mechanism for rapidly and precisely relatively aligning the axes of cooperating web coating rollers.

A further object of the invention is to provide improved mechanism for precisely relatively aligning the axes of cooperating web coating rollers, which mechanism is so arranged that in the event that the web breaks and starts to wind onto one of the rollers, the rollers may shift bodily apart.

Another object of the invention is to provide improved mechanism for precisely relatively aligning the axes of cooperating web coating rollers, which mechanism is so arranged as to permit the rollers to be moved bodily apart when the web is to be initially introduced therebetween.

Other and further objects, features and advantages of the invention will become apparent as the description of a preferred embodiment thereof proceeds.

Referring now to the drawings:

FIG. 1 is a side elevational view of a web coating apparatus showing the mechanism of the present invention for adjusting the position of one of the coating rollers;

FIG. 2 is a plan view showing the mechanism of the present invention associated with one end of the adjustable roller;

FIG. 3 is a side elevational view showing the mounting of the bearing at one end of the roller and also showing the means for adjusting the position of the bearing;

Figure 4:
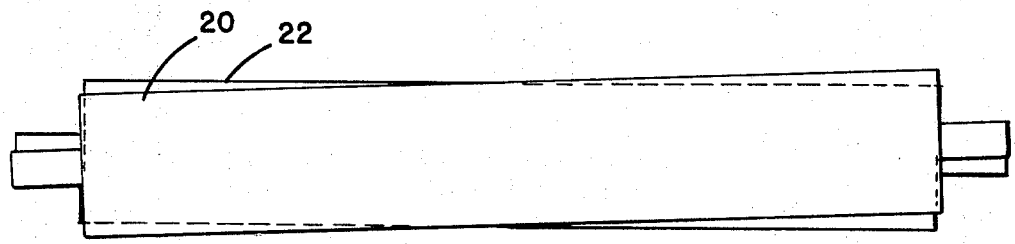
FIG. 4 is a diagrammatic plan view showing the skewed relationship of the coating rollers.

The web 10 to be uniformly coated, after having one or both surfaces thereof flooded with an excess of liquid coating material supplied as by means of nozzles 12 and 14, is pulled by a pair of squeezed together rollers 16 and 18 between a pair of spaced apart hard surfaced rollers 20 and 22. Rollers 20 and 22 are suitably driven through drive chains 24 and 26 respectively from a common drive 28 and serve to uniformly spread the coating material over the surface of the web and doctor off the excess, which excess runs into a trough 30 from which it is collected for recirculation through the system.

The ends of rollers 20 and 22 are of reduced diameter to facilitate mounting. One end of roller 22 is rotatably mounted in a bearing block 32 supported by and between a pair of uprights 34 and 36 and the other end of said roller is similarly mounted in a bearing block 38 supported by a similar pair of uprights located on the opposite side of web 10, one of said latter uprights being indicated in FIG. 5 at 40. Roller 22 extends horizontally and perpendicular to the line of travel of the web and the bearings therefor are vertically adjustable in any desired manner for a reason presently to be explained.

Roller 20 is rotatably mounted at one end in a bearing block 42 which is keyed to uprights 34 and 36 so as to be both vertically and to a lesser extent horizontally slidable within said uprights. The keyed connection between bearing block 42 and upright 34 is illustrated in FIG. 2 from which it will be appreciated that while block 42 may have a limited horizontal movement in a direction perpendicular to the axis of roller 20, it is restrained from moving longitudinally of said roller. The other end of roller 20 is mounted in a bearing 44 keyed to uprights 40 in a manner similar to the connection between block 42 and uprights 34 and 36. A bracket 46 secured to upright 34 and a bracket 48 secured to upright 36 underlie bearing block 42 and said brackets serve to fix the normal elevation of the bearing block. A similar pair of brackets, not shown, support bearing block 44. Thus, the precise height and general horizontal disposition of roller 20 are fixed but the ends of said roller may be shifted to a limited degree in a horizontal plane so as to dispose said roller in a direction askew of roller 22, as illustrated in FIG. 4. The bearings between shaft 20 and bearing blocks 42 and 44 are of the self-adusting type so that the slight misalignment between the shaft and the blocks when the shaft is skewed does not cause binding.

The rollers 20 and 22 normally weigh several hundred pounds each so that the weight of roller 20 is generally sufficient to hold the bearing block 42 firmly against the supporting brackets 46 and 48 and to hold the bearing block 44 against its supporting brackets. However, to further insure against accidental lifting of the bearing blocks additional means is provided for holding them at the desired elevation, as will now be explained. Since these additional means are the same for both blocks 42 and 44, only the mechanism for block 42 will be described in detail.

An integral lug 50 extends above block 42 and pivotally connected thereto as by means of a pin 52 is the lower end of a shaft 54 the upper end of which is threaded. A yoke 56 is adjustably connected to the upper end of shaft 54 by a pair of nuts 58 and 60. A pair of parallel links 62, only one of which is shown, extend through the yoke on opposite sides of the shaft. At one end, links 62 are pivotally connected by means of a pin 64 to a lug 66 on the top of upright 36 and the other ends of said links are provided with elongated slots 68 into which extend eccentrics 70 of a shaft 72 rotatably mounted in a lug 74 on the top of upright 34. A handle 76 is connected to shaft 72 whereby said shaft may be selectively rotated so as to cause the eccentrics 70 to lift one end of links 62 and thereby through yoke 56 raise shaft 54 and the bearing 42 whereby to lift roller 20 and facilitate the lacing of the web between roller 20 and roller 22. A threaded rod 78 secured to the top of upright 34 extends between the links 62 and a spring 80 surrounding said rod is held compressed against said links by a pair of nuts 82 screwed onto the upper end of the shaft. A threaded rod 84 secured to upright 36 extends between links 62 adjacent the pivot 64 and a spring 86 surrounding this rod is held compressed against the links by a pair of nuts 88. Thus the bearing block 42 is normally held firmly seated against the brackets 46 and 48 whereby to establish the vertical position of one end of roller 20. Similar mechanism is employed for holding bearing block 44 against its supporting brackets and for raising it selectively to facilitate the lacing of the web between rollers 20 and 22.

The desired spacing between rollers 20 and 22 is brought about by adjusting the height of roller 22 in any conventional manner. Rather it should be said that the spacing of the rollers at the transverse center line is so adjusted, for as previously mentioned and as will now be explained, said rollers are slightly askew and the spacing at the ends of the rollers is greater than at the middle. The skew adjustment of roller 20 is accomplished by horizontally shifting the bearing blocks 42 and 44 and since these two blocks are shifted in similar manners the means for shifting block 42 will first be described in detail.

Rigidly secured to the outside face of bearing block 42 as by means of bolts 90 and 92 is a heavy plate 94. As shown in FIG. 2, plate 94 is slightly spaced from block 42 in the vicinity of upright 34 so as not to contact the upright when the bearing block is shifted to the right from the position shown in FIG. 2. Except for ease of construction, plate 94 could just as well be an integral part of bearing block 42. A pin 96 is secured in plate 94 and said pin is connected by a link 98 to a pin 100 secured in one leg of an L-shaped member 102. As shown in FIG. 3, link 98 is constituted of two pieces secured together by a bolt 104 which is tightened sufficiently that there is substantially no clearance between the link and the pins 96 and 100 but not so tightly that the link cannot turn or pivot about the pins.

A plate 106 is secured to upright 34 by means of four bolts 108, 110, 112 and 114 (see FIG. 5) which screw into the upright and a bolt 116 which presses against the upright whereby the plate may be rather accurately positioned. As shown in FIG. 2, an end 118 of plate 106 is aligned with an end 120 of the short arm of L-shaped member 102. The end 118 of plate 106 is provided with screw threads and a retainer member 122 secured to the end 118 by means of a pair of bolts 124 and 126 is provided with a corresponding set of screw threads. The threads in the plate 106 and the retainer 122 match and engage a set of threads 128 provided on the head end of the shank of a screw 130. The end 120 of L-shaped member 102 and a retainer member 132 secured thereto by bolts 134 and 136 are provided with screw threads which match and engage threads 138 provided on the other end of the shank of the screw 130. The bolts securing retainer members 122 and 132 are adjusted tight enough that there is substantially no backlash or play in the screw 130 but not so tight that said screw cannot be turned.

The threads 138 of screw 130 are of a different pitch than the threads 128 whereby rotation of the screw is effective to impart horizontal movement to the L-shaped member 102 and to bearing block 42 to which said member is connected. For example, if the threads 128 have a pitch of ⅛ inch and the threads 138 have a pitch of ⅒ inch, then when screw 130 is turned in a direction to cause it to move bodily to the left as viewed in FIG. 2 within member 106 and retainer 122, one full turn of the screw will move the screw to the left by ⅛ inch but the threads 138 will screw ⅒ inch into member 102 and retainer 132 whereby member 102 is itself displaced to the left by the difference between ⅛ and ⅒ inch, or 0.025 inch. If the threads 128 have a pitch of ⅒ inch and the threads 138 have a pitch of ⅛ inch, then one full turn of the screw will displace the screw bodily to the left by ⅒ inch but it will screw into member 102 and retainer 132 by ⅛ inch and thus member 102 will move to the right by the difference between ⅛ inch and ⅒ inch.

Secured to screw 130 is a drum 140 provided with indicia and secured to plate 106 is a pointer 142 which overlies the drum and which is also provided with a scale. Between the indicia on the drum and the scale on the pointer, one may determine the exact amount of movement imparted to bearing block 42 by any amount of rotation of screw 130. Thus, the indicia on drum 140 may be in the form of twenty-five evenly spaced numbered lines. Then if one completed revolution of screw 130 causes bearing block 42 to move 0.025 inch, one twenty-fifth of a revolution causes the bearing block to move 0.001 inch. The scale on pointer 142 indicates the total number of revolutions imparted to screw 130 from a given starting position. Thus bearing block 42 of the upper roller 20 may be rapidly and precisely positioned slightly vertically offset from the bearing block 32 of the lower roller 22.

Figure 5:
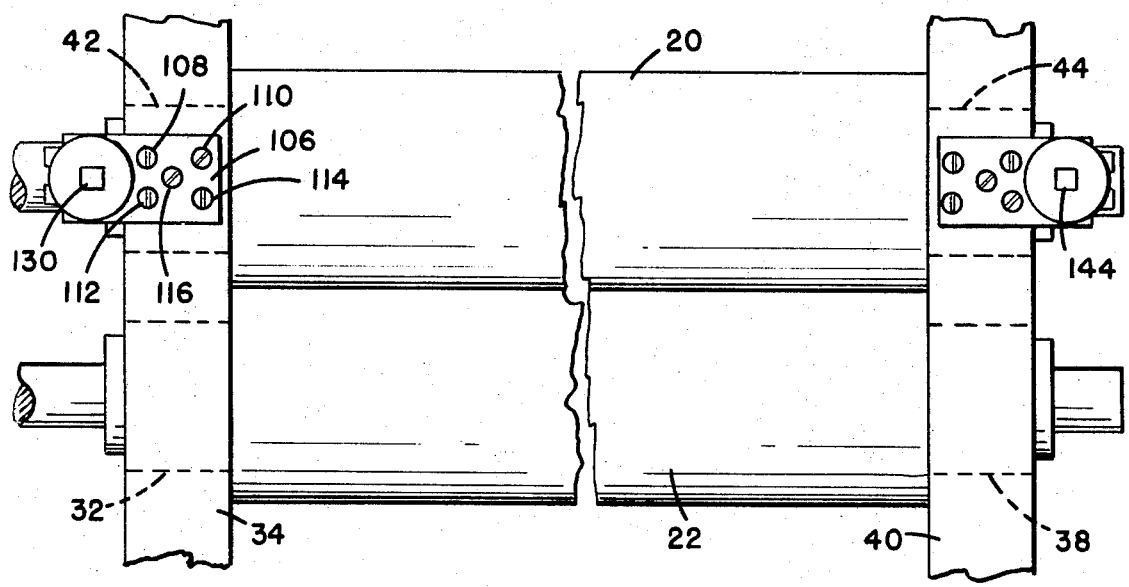
FIG. 5 is a front elevational view of the two rollers showing the adjusting mechanism applied to both ends of the upper roller.

As indicated in FIG. 5, a screw 144 is associated with bearing block 44 in the same manner as screw 130 is associated with bearing block 42 and thus bearing block 44 may be precisely positioned slightly horizontally offset from bearing block 38 of the lower roller. Bearing block 44 is horizontally shifted in the opposite direction from bearing block 42 so that the center lines of the rollers 20 and 22 cross and the rollers are closer together in the middle than at the ends. The actual amount of skewness of roller 20 is fairly small and varies only slightly although very definitely in order to produce even coatings at different speeds of operation. The actual amount of skewness necessary to produce an even coating at any speed may be determined empirically and the setting of screws 130 and 144 necessary to produce this amount of skewness may be noted by reading the indicia on drum 140 and the scale of pointer 142 for screw 130 and similar readings for the screw 144. Subsequently, when the coating speed is changed, the skewness of the roller may be quickly and accurately changed by merely turning screws 130 and 144 to the known proper settings.

The link 98 serves to accurately transmit the motion of L-shaped member 102 to bearing block 42 whereby said block is precisely positioned in accordance with the rotated position of screw 130 but said link also permits the bearing block to be selectively raised by the handle 76 and also permits the block to shift upward should the web 10 break and start to wind around and build up on either roller 20 or 22.

Having thus described a preferred embodiment of the invention, what is claimed is:

1. Apparatus for accurately positioning a roller comprising a pair of uprights, a bearing block for a roller supported between said uprights, means for precisely fixing the horizontal alignment of said bearing block with respect to said uprights, said means comprising a screw having at the head end of the shank threads of a certain pitch and at the other end of the shank having threads of a different pitch, a member rigidly secured to one of said uprights and threadingly engaging the threads at the head end of the shank of said screw, and a member connected to said bearing block and threadingly engaging the threads at the other end of the shank of said screw whereby clockwise rotation of said screw causes horizontal displacement of said bearing block in a first direction and counterclockwise rotation of said screw causes horizontal displacement of said bearing block in the direction opposite of said first direction.

2. The apparatus set forth in claim 1 comprising means for indicating the amount of rotation imparted to said screw.

3. The apparatus set forth in claim 2 wherein the means for indicating the amount of rotation imparted to the screw comprises an indicia bearing drum secured to said screw and a scaled pointer connected to the member rigidly secured to one of the uprights.

4. The apparatus set forth in claim 1 wherein the member connected to said bearing block is so connected by means of a link pivotally secured at one end to said member connected to the bearing block and at the other end to said bearing block, whereby said bearing block is capable of vertical displacement.

References Cited

UNITED STATES PATENTS

| | | | |
|---|---|---|---|
| 1,179,999 | 4/1916 | Blevney | 308—58 |
| 2,321,329 | 6/1943 | Stafford | 308—32 |
| 957,921 | 5/1910 | Whitehead | 308—58 |
| 1,777,807 | 10/1930 | Pecker | 308—59 |
| 2,082,498 | 6/1967 | Kent | 308—60 |
| 2,174,728 | 10/1939 | Potdevin | 308—59X |
| 2,439,102 | 4/1948 | Rothweiler | 308—58X |
| 2,785,021 | 3/1957 | Whittum | 308—58 |
| 3,363,848 | 1/1968 | Neebel | 308—62X |
| 2,483,443 | 10/1949 | Spence | 308—62X |

FRED C. MATTERN, JR., Primary Examiner

F. SUSKO, Assistant Examiner